United States Patent [19]

Komiya et al.

[11] Patent Number: 4,701,768

[45] Date of Patent: Oct. 20, 1987

[54] THERMO-MAGNETIC RECORDING DEVICE

[75] Inventors: Ryohei Komiya, Nagoya; Masaaki Terazawa, Ichinomiya, both of Japan

[73] Assignee: Brother Kogyo Kabushiki Kaisha, Aichi, Japan

[21] Appl. No.: 928,033

[22] Filed: Nov. 7, 1986

[30] Foreign Application Priority Data

Nov. 11, 1985 [JP] Japan ............................... 60-252496

[51] Int. Cl.[4] ............................................ G01D 15/12

[52] U.S. Cl. ..................................... 346/74.4; 346/742

[58] Field of Search .............................. 346/74.2–74.5, 346/76 R, 76 PH; 430/34, 39; 360/59, 118; 355/3 B, 3 E, 15; 400/119; 101/DIG. 5; 358/301

[56] References Cited

U.S. PATENT DOCUMENTS 4,547,782 10/1985 Yamasawa et al. ................ 346/74.2

4,621,269 11/1986 Kimoto et al. ..................... 346/74.2

*Primary Examiner*—Arthur G. Evans

*Attorney, Agent, or Firm*—Parkhurst & Oliff

[57] ABSTRACT

Is disclosed a thermo-magnetic recording device in which a magnetized latent image is produced on a magnetic layer which is initialized through unidirectional magnetization thereof, in the process of locally heating the magnetic layer. The thermo-magnetic recording device includes: (a) a heat generating roller for heating a local portion of the magnetic layer, through contact of an outer surface of the roller with the local portion of the magnetic layer; and (b) a magnetic-field generating device for generating, at the local portion of the magnetic layer, a magnetic field which has the same N-S direction as that of the unidirectional magnetization, and thereby initializing the magnetic layer.

6 Claims, 6 Drawing Figures

THERMO-MAGNETIC RECORDING DEVICE

BACKGROUND OF THE INVENTION

1. Field of the Art

The present invention relates to a thermo-magnetic recording device in which a magnetized latent image is formed on a magnetic layer, and also to the art of initializing the magnetic layer through magnetization in the same direction over its entire recording area.

2. Related Art Statement

There is known a thermo-magnetic recording device in which a magnetized latent image is produced on a magnetic layer made of a ferromagnetic substance, by means of locally heating the magnetic layer. Such a magnetized latent image produced on the magnetic layer is utilized for obtaining a so-called "magnetic picture" or "magnetography". Usually, the magnetized latent image is produced on the magnetic layer by means of reversing the N-S direction (direction of magnetization) of individual locations (segments) of the magnetic layer which has been initialized through unidirectioal magnetization, i.e., magnetization in the same N-S direction over an entire recording area of the layer. The initialization of the magnetic layer is carried out by positioning the magnetic layer in a magnetic field produced by a magnetic-field generating device, in the conventional thermo-magnetic recording device.

3. Problem Solved by the Invention

However, the above-identified thermo-magnetic recording device of a conventional type requires a comparatively high, external magnetic field for initializing the magnetic layer, since the magnetic layer is initialized solely by the external magnetic field. In order to meet that requirement, the conventional recording device must employ a large-sized magnetic-field generating device. In association with the above-indicated problem, the conventional thermo-magnetic recording device has another disadvantage of an unsatisfactory efficiency of magnetization of the magnetic layer.

SUMMARY OF THE INVENTION

It is therefore an object of the present invention to provide a thermo-magnetic recording device which is small-sized.

It is another object of the invention to provide a thermo-magnetic recording device which initializes a magnetic layer with an improved efficiency of magnetization.

According to the present invention, there is provided a thermo-magnetic recording device in which a magnetized latent image is produced on a magnetic layer which is initialized through unidirectional magnetization thereof, by means of locally heating the magnetic layer, the recording device including: (a) a heat generating roller for heating a local portion of the magnetic layer, through contact of an outer surface of the roller with the local portion of the magnetic layer; and (b) a magnetic-field generating device for generating, at the local portion of the magnetic layer, a magnetic field which has the same N-S direction as that of the unidirectional magnetization, and thereby initializing the magnetic layer.

In the thermo-magnetic recording device constructed as described above, the local portion (segment) of the magnetic layer which is in contact with the heat generating roller is heated by the heat-generating roller up to temperatures above the Curie Point of the magnetic layer, ans subsequently cooled down to temperatures below the Curie Point, in the magnetic field generated by the magnetic-field generating device. In this process, the local portion or segment of the magnetic layer is initialized through the unidirectional magnetization. This process is a so-called "thermal redidual magnetism" phenomenon. By utilizing the thermal redidual magnetism phenomenon, the initialization of the magnetic layer is carried out in a lower external magnetic field, as compared with the case where the magnetic layer is initialized by an external magnetic field only. In the instant thermo-magnetic recording device, the magnetic layer can be magnetized to the extent of its substantially saturated residual magnetization, in a comparatively low magnetic field. Thus, the instant recording device may employ a small-sized magnetic-field generating device. Furthermore, the initialization of the magnetic layer can be carried out through the unidirectional magnetization with an improved efficiency.

In a preferred embodiment of the thermo-magnetic recording device of the invention, the recording device further includes a back-up roller which cooperates with the heat generating roller to pinch the magnetic layer therebetween.

In a preferred form of the above-indicated embodiment of the recording device, the recording device further includes a cleaning roller which is disposed in contact with the heat generating roller and cleans residual magnetic toner off the heat generating roller. The magnetic toner is used for developing the magnetized latent image on the magnetic layer. In this case, the recording device may further include an endless magnetic recording belt which consists of the magnetic layer and a non-magnetic flexible sheet on which the magnetic layer is supported. The magnetic recording belt may be fed in one direction through a production station at which the magnetized latent image is produced on the magnetic layer, a development station at which the produced latent image is developed on the magnetic layer, a transcription station at which the developed latent image on the magnetic layer is transcribed on a recording medium, and an initialization station at which the magnetic layer having thereon the magnetized latent image is intialized through said unidirectional magnetization, in the order of description. It is recommeded that the heat generating roller, the back-up roller, the cleaning roller, and the magnetic-field generating device are disposed at the initialization station, and that the magnetic-field generating device includes a magnet having an N pole and an S pole on both sides of the heat generating roller, respectively.

In another embodiment of the recording device according to the invention, the recording device further includes a thermocontroller circuit which permits the heat generating roller to be selectively held to a first temperature at which a residual magnetism of the magnetic layer is demagnetized, and to a second temperature at which the residual magnetism of the magnetic layer is not demagnetized.

BRIEF DESCRIPTION OF THE DRAWINGS

The foregoing and other objects, features and advantages of the present invention will be better understood by reading the following detailed description on several preferred embodiments of the invention, when considered in connection with the accompanying drawings, in which.

DETAILED DESCRIPTION OF THE PREFERRED EMBODIMENT

Figure 1:
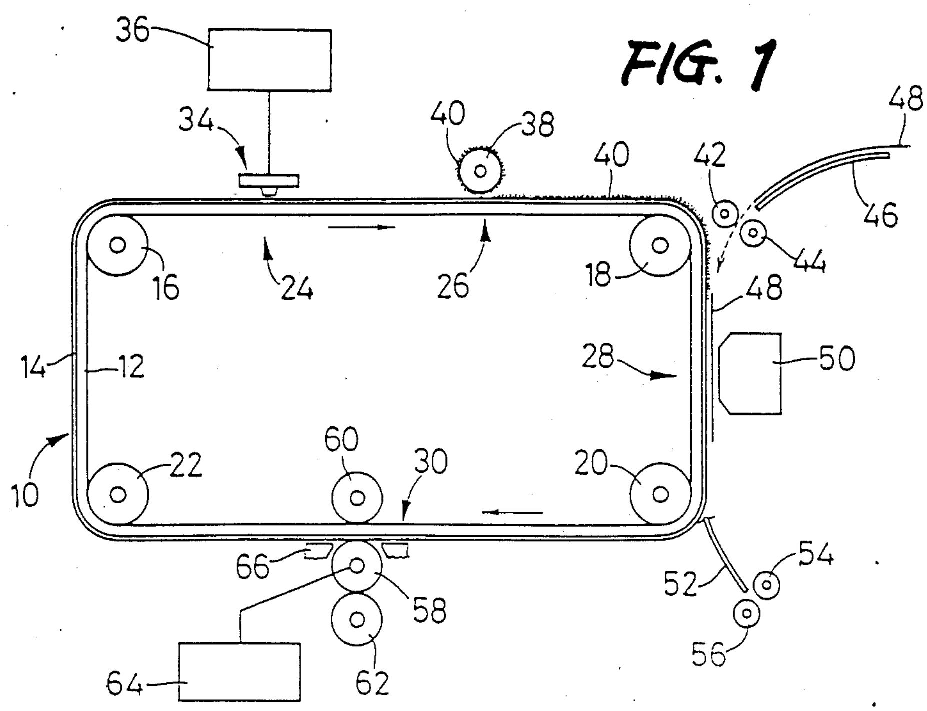
FIG. 1 is an illustrative view of a main part of a thermo-magnetic recording device according to the present invention.

Referring first to FIG. 1, there is illustrated a preferred embodiment of a thermo-magnetic recording device according to the principle of the invention. In the figure, reference numeral 10 designates a recording belt of an endless type. The endless recording belt consists of a non-magnetic flexible sheet 12 and a magnetic layer 14 fixedly supported on an outer surface of the non-magnetic sheet 12. The magnetic layer 14 is made of a ferromagnetic material which can be magnetized by means of a residual magnetism that is produced by cooling of the material after heating. The magnetic layer 14 can be magnetized in opposite directions parallel to its plane. The recording belt 10 is continuously fed by means of four driving feed rollers 16, 18, 20, 22, with a predetermined tension, in one direction (recording direction) as indicated at an arrow in FIG. 1. On a path of feeding of the recording belt 10, there are provided four stations, that is, a production station 24 at which a magnetized latent image is produced on the magnetic layer 14 of the recording belt 10, a development station 26 at which the magnetized latent image is developed on the magnetic layer 14, a transcription station 28 at which the developed latent image on the magnetic layer 14 is transcribed on a recording medium in the form of a sheet 48, and an initialization station 30 at which the magnetic layer 14 having the magnetized latent image thereon is initialized through unidirectional magnetization (which will be described).

Figure 2:
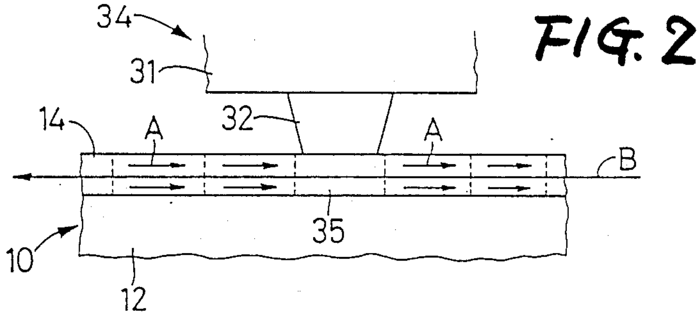
FIG. 2 is an enlarged view of a production station of the recording device of FIG. 1, at which a magnetized latent image is produced on a magnetic layer.

Referring next to FIG. 2, there is provided a thermal head 34 at the production station 24 described above. The thermal 34 includes a substrate 31 and a multiplicity of heat-generating elements 32 supported by the substrate 31. In the figure, the heat-generating elements 32 are held in slinding contact with the magnetic layer 14 of the recording belt 10. At this station 24, there is also provided a first magnetic-field generator (not shown) which generates a magnetic field along the plane of the magnetic layer 14, such that the N-S direction adjacent to the thermal head 34 is opposite to that of the unidirectional magnetization of the magnetic layer 14. The thermal head 34 is connected to a driver circuit 36. Current pulses generated by the driver circuit 36 are selectively applied to the multiplicity of heat-generating elements 32 of the thermal head 34, whereby the magnetic layer 14 is locally heated up to temperatures above the Culie Point of the layer 14. As the recording belt 10 is further fed in the recording direction, the heated local portion (segment) of the recording belt 10 is cooled, and is consequently magnetized in an N-S direction opposite to that of the unidirectional magnetization of the magnetic layer 14, according to the magnetic field produced by the magnetic-field generator not shown. Namely, the N-S direction of magnetization of the heated and then cooled segment of the magnetic layer 14 is reversed opposite to that of the unidirectional magnetization through which the magnetic layer 14 is initialized, whereby a local portion (segment) of the desired latent image is produced on the magnetic layer 14. A magnetized latent image consists of numbers of segments that are magnetized in the reversed N-S direction opposite to that of the initialization (unidirectional magnetization) of the magnetic layer 14.

Figure 3:
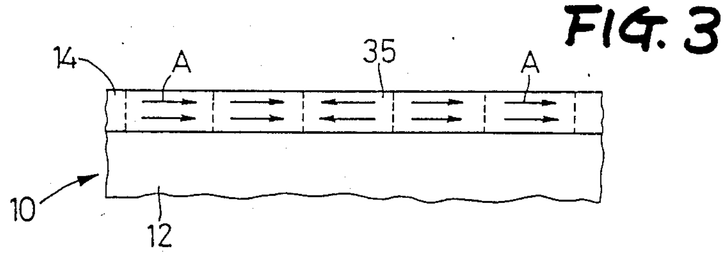
FIG. 3 is an enlarged view of a segment of the magnetic layer which has been magnetized at the production station of FIG. 2 to produce the latent image.

In FIG. 2, reference numeral 35 designates a local portion (segment) of the magnetic layer 14 which has been demagnetized through heating over the Curie Point of the layer 14. Arrow A in each of the segments of the magnetic layer 14 indicates the N-S direction of the initial unidirectional magnetization through which the magnetic layer 14 is initialized, while arrow B indicates the N-S direction of the magnetic field produced by the first magnetic-field generator. Referring to FIG. 3, there is illustrated a segment 35 whose N-S direction (direction of magnetization) has been reversed by means of heating and then cooling carried out by the thermal head 34.

At the development station 26 of the instant thermo-magnetic recording device, there is disposed a toner supply roller 38 which supplies magnetic toner 40 to the magnetic layer 14 so as to form a developed picture corresponding to the magnetized latent image on the magnetic layer 14. At the next transcription station 28, there is provide a pair of sheet feed rollers 42 and 44 for feeding the sheet 48 which is guided by a sheet guide 46. At this station 28, there is also provided a transcriber device 50 which transfers the magnetic toner 40 on the magnetic layer 14, onto one surface of the sheet 48. Thus, the developed picture on the magnetic layer 14 is transcribed on the sheet 48. After the transcription, the sheet 48 is guided by a sheet guide 52, and then discharged by a pair of sheet discharge rollers 54 and 56. A fixing device (not shown) fixes the magnetic toner 40 to the sheet 48.

Figure 4:
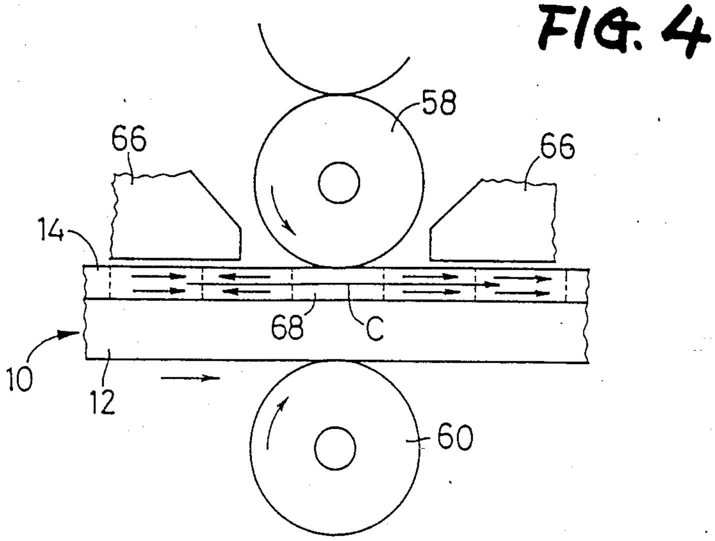
FIG. 4 is an enlarged view of an initialization station of the recording device of FIG. 1, at which the magnetized latent image is developed on the magnetic layer.

After having passing the transcription station 28, the magnetic layer 14 still has the magnetized latent image thereon. That is, the N-S direction of the magnetic layer 14 which has passed the transcription station 28, is not unidirectional. Accordingly, the magnetic layer 14 must be initialized through unidirectional magnetization over its entire recording area, for the production of a new latent image thereon. At the next initialization station 30, there are dispsed a heat-generating roller 58 and a back-up roller 60 which cooperate with each other to pinch the recording belt 10 over the overall width of the belt 10. In contact with the heat-generating roller 58, there is disposed a cleaning roller 62 which is preferably made of a felt material. The heat-generating roller 58 incorporates a heater (not shown) which is connected to a controller circuit 64. The controller circuit 64 is adapted to selectively place the heat-generating roller 58 in plural positions which includes a first position in which the roller 58 heats a segment of the magnetic layer 14 up to temperatures above the Curie Point of the layer 14, and a second position in which the roller 58 lowers the temperature of the layer 14 down below the Curie Point. Adjacent to the magnetic layer 14 at the ininitializatin station 30, there is provided a second magnetic-field generator (magnetic-field generating device) 66 which generates a magnetic field having the same N-S direction as that of the initial unidirectional magnetization of the magnetic layer 14, i.e., one of opposite directions parallel to the plane of the layer 14. As the magnetic layer 14 is continuously fed, the second magnetic-field generator 66 continuously initializes, through the unidirectional magnetization, segments of the layer 14 which are concurrently cooled down below the Curie Point after heated by the heat-generating roller 58 up to above the Curie Point. In FIG. 4, arrow C indicates the N-S direction of the magnetic field generated by the second magnetic-field generator 66. The second magnetic-field generator 66 is an electromagnet which has an N pole and an S pole on both sides of the heat-generating roller 58, respectively.

Figure 5:
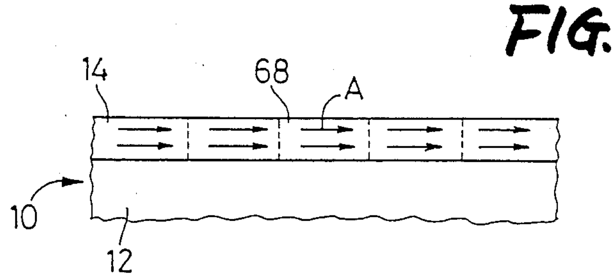
FIG. 5 is an enlarged view showing the process of initilizing individual segments of the magnetic layer at the initialization station of FIG. 4.

So as to initialize the magnetic layer 14 for producing a new magnetized latent image on the layer 14, the heat-generating roller 58 is held by the controller circuit 64 in its first position in which the roller 58 heats the magnetic layer 14 up to above the Curie Point of the layer 14. As clearly shown in FIG. 4, a segment 68 of the magnetic layer 14 is heated up to above the Curie Point through contact thereof with the outer surface of the heat-generating roller 58, when fed between the roller 58 and the back-up roller 60, and consequently demagnetized. After passing between the rollers 58, 60, the segment 68 of the magnetic layer 14 is cooled down to below the Curie Point, and magnetized over its entire width in the same N-S direction as the direction C of the magnetic field of the second magnetic-field generator 66. Thus, the magnetic layer 14 is continously initialized, as the recording belt 10 is fed in the recording direction. FIG. 5 shows several segments of the magnetic layer 14 which have been initialized.

In the case where the thermo-magnetic recording device is placed upon operation of a mode switch (not shown) in its re-recording mode in which the recording device is required to record the magnetized latent image of the magnetic layer 14 on a plurality of sheets 48, the thermocontroller circuit 64 lowers the temperature of the heat-generating roller 58 so as to bring the roller 58 into its second position in which the roller 58 is held to temperatures below the Curie Point of the layer 14, as a result of responding to signals supplied from the not shown mode switch. Consequently, the magnetic layer 14 of the magnetic belt 10 is fed through between the heat-generating roller 58 and the back-up roller 60, without increase in temperature above the Curie Point. That is, the magnetized latent image on the magnetic layer 14 is not demagnetized or eliminated at the initialization station 30. Subsequently, the magnetic layer 14 (belt 10) is fed through the production station 24 to the development station 26 at which the magnetized latent image is again developed on the magnetic layer 14 using the magnetic toner 40. Thus, the magnetized latent image is transcribed, through the medium of the magnetic toner 40, from the magnetic layer 14 onto another sheet 48 at the transcription station 28.

Figure 6:
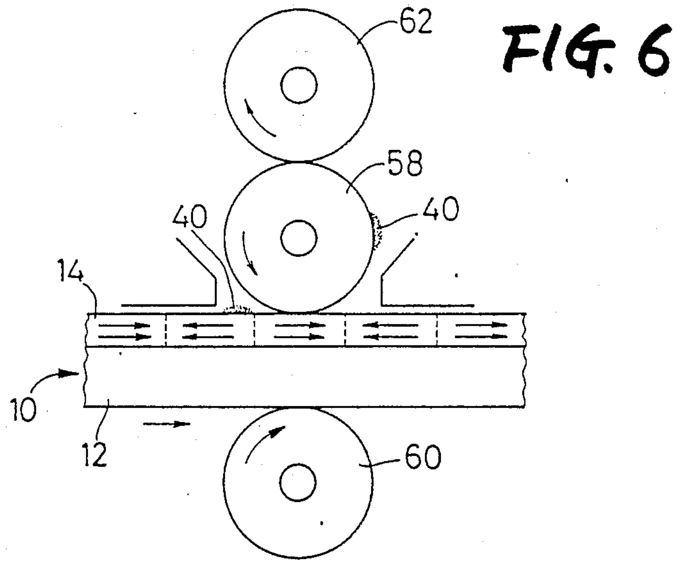
FIG. 6 is an enlarged view showing the process of cleaning a heat-generating roller at the initialization station of FIG. 4.

In FIG. 6, the heat-generating roller 58 also serves for receiving residual magnetic toner 40 from the magnetic layer 14, as a result of sticking of the residual toner 40 to the outer surface of the roller 58. The cleaning roller 62 which is disposed in contact with the heat-generating roller 58 gathers the sticking toner 40 off the roller 58. Thus, a picture which is recorded on the sheet 48 in the re-recording mode of the instant recording device is free from reduced quality which is often encountered due to the residual magnetic toner 40 which has been left on the magnetic layer 14 after having passed between the heat-generating and back-up rollers 58, 60.

As is apparent from the foregoing description, the magnetic layer 14 is initialized through the unidirectional magnetization, i.e., the magnetization in the same N-S direction as that of the magnetic field produced by the second magnetic-field generator 66, while the layer 14 is heated by the heat-generating roller 58 up to temperatures above the Curie Point of the layer 14 and then cooled down to temperatures below the Curie Point. This magnetization (initialization) of the magnetic layer 14 is so-called "thermal residual magnetism". By means of utilizing the thermal residual magnetism, the magnetic layer 14 is magnetized to the extent of its substantially saturated residual magnetization, in a lower external magnetic field, as compared with the case where the layer 14 is magnetized (initialized) solely by the external magnetic filed. Therefore, the instant thermo-magnetic recording device may use a smaller-sized magnetic-field generator than that of conventional thermo-magnetic recording devices. Moreover, the efficiency of the initialization of the magnetic layer 14 is improved due to the improved magnetization of the layer 14.

Further, in the instant recording device, the magnetized latent image formed on the magnetic layer 14 can be repeatedly transcribed on plural sheets 48, since the layer 14 is fed without demagnetization of the latent image through between the back-up roller 60 and the heat-generating generating roller 58 which is cooled down below the Curie Point of the layer 14 in the re-recording mode. In this connection, it is to be appreciated that the residual magnetic toner 40 left on the magnetic layer 14 is gathered by the cleaning roller 61 by way of the heat-generating roller 58.

While the present invention has been described in detail with reference to the preferred embodiment, it is to be understood that the invention may be otherwise embodier, For example, the non-magnetic flexale sheet 11 on which the magnetic layer 14 is fixedly supported may be replaced with a rotatable cylindrical drum which supports the magnetic layer 14 on the outer surface thereof.

While in the illustrated embodiment, the thermocontroller circuit 64 is capable of reducing the temperature of the heat-generating roller 58 down below the Curie Point of the magnetic layer 14, the circuit 64 may not have such capability (function) in the case where the recording device does not have the re-recording mode, that is, in the case where the magnetized latent image of the magnetic layer 14 is not required to be transcribed on plural sheets 48.

Further, at the initialization station 30, the heat-generating roller 58 may have a further cleaning roller on one or both sides upstream and/or downstream of the roller 58 as viewed in the feeding director of the magnetic recording belt 10. In this case, the further added cleaning roller(s) is(are) disposed in contact with the roller 58, as the cleaning roller 62 is.

While the illustrated recording device is of a type in which the magnetic layer 14 is magnetized in opposite directions parallel to the plane of the layer 14, the present invention is applicable to a recording device of a type in which a magnetic layer is magnetized vertically, i.e., in opposite directions normal to the plane of the layer.

It is to be understood that the present invention may be further embodied with various improvements, modifications and changes which may occur to those skilled in the art, but without departing from the spirit and scope of the invention.

What is claimed is:

1. A thermo-magnetic recording device wherein a magnetized latent image is produced on a magnetic layer which is initialized through unidirectional magnetization thereof, by means of locally heating the magnetic layer, said recording device comprising:

a heat generating roller for heating a local portion of said magnetic layer, through contact of an outer surface of said roller with said local portion of said magnetic layer; and a magnetic-field generating device for generating, at said local portion of said magnetic layer, a magnetic field which has the same N-S direction as that of said unidirectional magnetization, and thereby initializing the magnetic layer.

2. A thermo-magnetic recording device according to claim 1, further comprising a back-up roller which cooperates with said heat generating roller to pinch said magnetic layer therebetween.

3. A thermo-magnetic recording device according to claim 2, further comprising a cleaning roller which is disposed in contact with said heat generating roller and cleans residual magnetic toner off the heat generating roller, said magnetic toner being utilized for developing said magnetized latent image on said magnetic layer.

4. A thermo-magnetic recording device according to claim 1, further comprising a thermocontroller circuit which permits said heat generating roller to be selectively held to a first temperature at which a residual magnetism of said magnetic layer is demagnetized, and to a second temperature at which said residual magnetism of the magnetic layer is not demagnetized.

5. A thermo-magnetic recording device according to claim 3, further comprising an endless magnetic recording belt which consists of said magnetic layer and a non-magnetic flexible sheet on which the magnetic layer is supported, said magnetic recording belt being fed in one direction through a production station at which said magnetized latent image is produced on the magnetic layer, a development station at which said produced latent image is developed on the magnetic layer, a transcription station at which said developed latent image on the magnetic layer is transcribed on a recording medium, and an initialization station at which said magnetic layer having thereon the magnetized latent image is intialized through said unidirectional magnetization, in the order of description.

6. A thermo-magnetic recording device according to claim 5, wherein, at said initialization station, there are provided said heat generating roller, said back-up roller, said cleaning rolle, and said magnetic-field generating device, and the magnetic-field generating device includes a magnet having an N pole and an S pole on both sides of said heat generating roller, respectively.

* * * * *